United States Patent [19]

Schmitz

[11] Patent Number: 4,814,908
[45] Date of Patent: Mar. 21, 1989

[54] THERMO SERVO FOR TRACK CENTERING ON A DISK

[75] Inventor: Brian D. Schmitz, Bloomington, Minn.

[73] Assignee: Magnetic Peripherals Inc., Minneapolis, Minn.

[21] Appl. No.: 937,270

[22] Filed: Dec. 3, 1986

[51] Int. Cl.$^4$ .............................................. G11B 5/596
[52] U.S. Cl. .................................. 360/77.02; 360/109; 318/634; 318/117; 310/306
[58] Field of Search ............ 360/75, 77, 76, 104–107, 360/109; 318/634, 117, 641, 592, 593; 310/306, 307; 60/528, 529

[56] References Cited

U.S. PATENT DOCUMENTS

| 954,682 | 4/1910 | Low et al. |  |
|---|---|---|---|
| 3,029,318 | 4/1962 | Fay et al. | 360/109 |
| 3,573,768 | 4/1971 | Harris . |  |
| 3,706,861 | 12/1972 | Giel | 360/75 |
| 3,754,151 | 8/1973 | Clark . |  |
| 4,099,211 | 7/1978 | Hathaway | 360/109 |
| 4,167,763 | 9/1979 | Kubota | 360/77 |
| 4,172,265 | 12/1979 | Sakamoto et al. | 360/77 |
| 4,268,880 | 5/1981 | Majima | 360/109 |
| 4,348,624 | 9/1982 | Anderson et al. | 318/634 |
| 4,374,402 | 2/1983 | Blessom et al. | 360/104 |
| 4,398,228 | 8/1983 | Bauck | 360/77 |
| 4,404,605 | 9/1983 | Sakamoto | 360/77 |
| 4,415,939 | 11/1983 | Ballard | 360/77 |
| 4,514,776 | 4/1985 | Koyana et al. . |  |
| 4,553,184 | 11/1985 | Ogishima | 360/104 |

FOREIGN PATENT DOCUMENTS

| 52-49014 | 4/1977 | Japan | 360/105 |
|---|---|---|---|
| 53-3207 | 1/1978 | Japan | 360/105 |
| 61-979 | 1/1986 | Japan | 360/109 |
| 61-74103 | 4/1986 | Japan . |  |

OTHER PUBLICATIONS

American Heritage Dictionary Second College Edition, Houghton Mifflin Company, 1983, p. 127.
Xerox Disclosure Journal, vol. 5, No. 5, "Thermal Servo System For Mechanical Positioning", Anderson et al., 10/80, p. 549.
IBM TDB, vol. 16, No. 5, "Magnetic Head with Piezoelectric Positioning", Stokes et al., 10/73, p. 1429.
IBM TDB, vol. 20, No. 6, "Bimetallic Variable Head Load/Unload Device", Nickols, 11/77, pp. 2411–2412.
IBM TDB, vol. 23, No. 9, "Bimetallic Mechanism for Loading and Unloading Magnetic Heads", Dreyfus et al., 2/81, pp. 4268–4269.

Primary Examiner—Alan Faber
Assistant Examiner—Steven R. Garland
Attorney, Agent, or Firm—Joseph A. Genovese; Robert M. Angus; Richard E. Billion

[57] ABSTRACT

An apparatus and method for positioning a transducer over the center of a track is disclosed. An arm carries the transducer. Embedded in the arm is a heating element. The heating element is positioned so that the linear expansion or contraction of the arm resulting from the temperature rise or drop due to the amount of heat applied to the arm by the heating element will move the transducer across the track. In operation, a constant amount of heat is initially applied to the arm to center the transducer. During tracking, a circuit varies the amount of power applied to the heating element so that the transducer is kept over the center of the track.

15 Claims, 3 Drawing Sheets

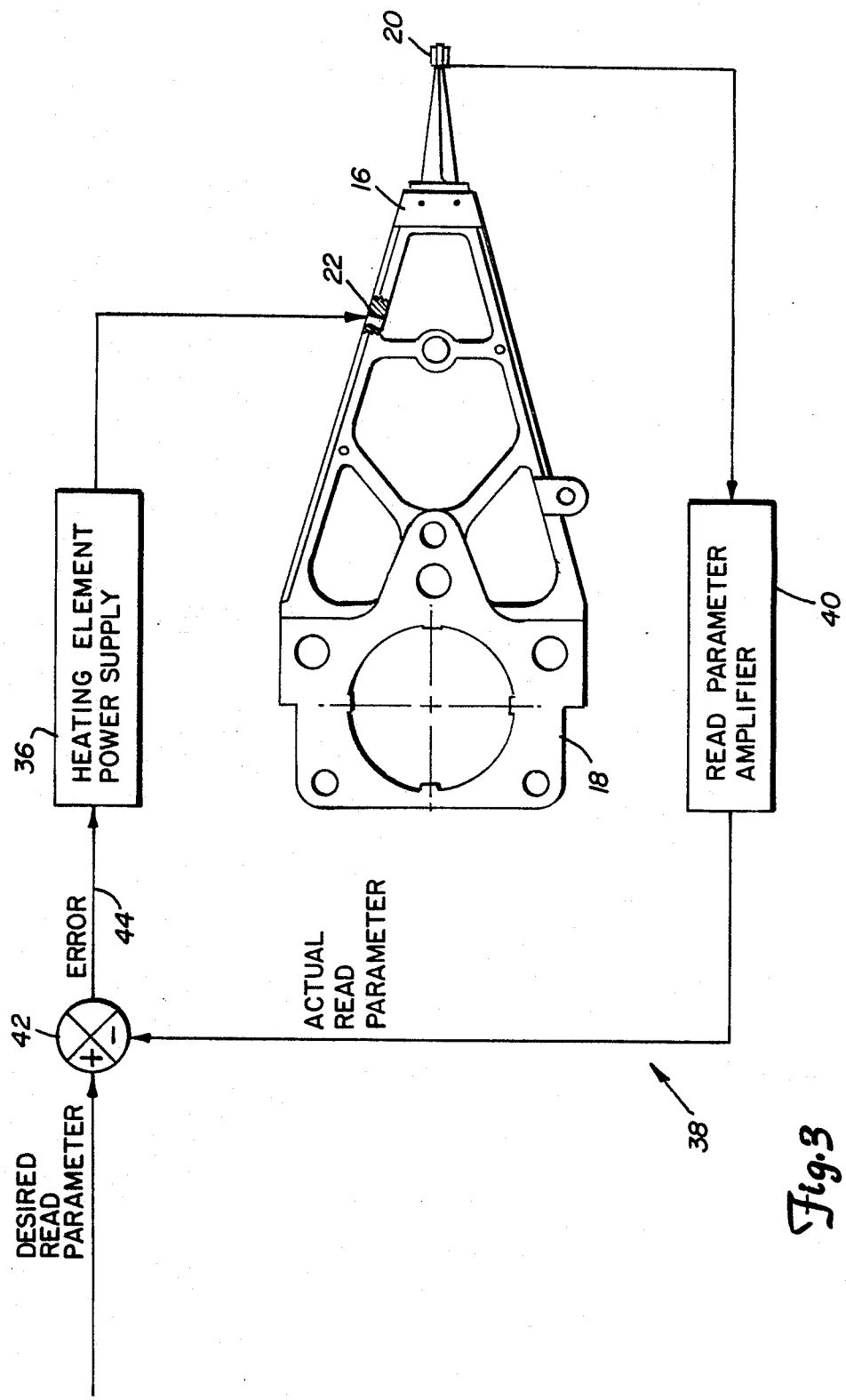

THERMO SERVO FOR TRACK CENTERING ON A DISK

BACKGROUND OF THE INVENTION

There are two basic methods of positioning read/write heads in magnetic disk drives using closed loop feedback circuits. The first method, called dedicated servo, dedicates one head and one disk in the disk drive to the task of acquiring position information. The dedicated head is referred to as the servo head and the dedicated disk is referred to as the servo disk. In this method, all the data heads and disks must maintain their positions relative to the servo head and the servo disk or off-track error will result. Off-track errors reduce read margins and may cause data errors. The servo head is in a closed loop feedback system with the servo disk. The other data heads and other disks in the disk drive do not have the benefit of a separate closed loop feedback system. Thus, in order to function properly the other disks and heads must maintain their original position with respect to the servo head and the servo disk over time, through temperature extremes and after mechanical wear.

The second method of positioning read/write heads is called embedded servo. Embedded servo uses position information written on the surface of each disk in the disk drive. Each disk and head have loop feedback circuit. This eliminates the requirement of the dedicated servo method that each data head maintains its position with respect to another data head through temperature extremes, over time and after mechanical wear.

However, many other disadvantages are associated with the embedded servo method. For example, embedded servo reduces soft sectored formatting and requires position information to be recorded on each disk. The position information on each disk reduces data capacity and increases drive complexity. Therefore, it is desirable to develop an apparatus and method in which all the benefits of dedicated servo can be maintained by compensating for slight distortions caused by wear over time and by temperature fluctuations.

SUMMARY OF THE INVENTION

Disclosed is a thermally compensating fixed arm which is capable of maintaining a data head over the center of a data track in the presence of environmental changes or mechanical wear. An arm made of a material capable of thermal expansion carries a transducer. One side of the arm carries a heating element. Varying the amount of power to the heating element causes linear expansion or contraction in the arm which moves the transducer across the track. A feedback loop circuit monitors a read parameter and when it varies from a desired state, the power to the heating element is varied to move the transducer to a position over the center of the track.

BRIEF DESCRIPTION OF THE DRAWINGS

For a better understanding of the present invention, reference may be had to the accompanying drawings, in which:

FIG. 3 is a schematic diagram showing a feedback circuit for the thermally compensating fixed arm.

These drawings are not intended as a definition of the invention but are provided solely for the purpose of illustrating the preferred embodiment of the invention, described below.

DESCRIPTION OF THE PREFERRED EMBODIMENT

Figure 1:
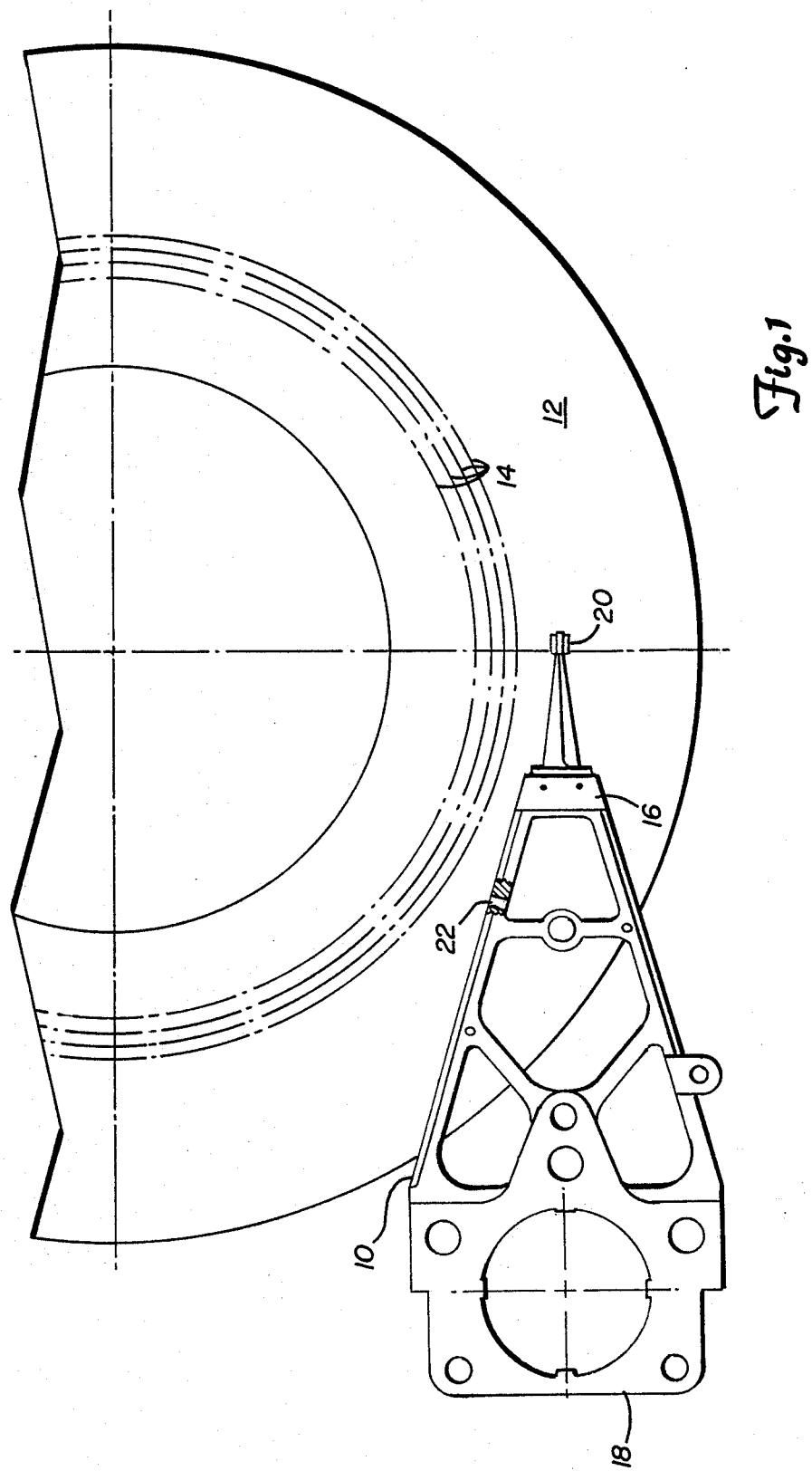
FIG. 1 is a top view of a thermally compensating fixed arm tracking over a magnetic disk.

Illustrated in FIG. 1 is a preferred embodiment of the present invention. A thermally compensating fixed arm 10 is shown tracking over a disk 12. The disk has a plurality of tracks 14. The arm 10 has a free end 16 and a pivotally attached end 18. Attached to the free end 16 of the arm is a transducer 20 for reading data. Preferably, the transducer tracks over the center of one of the tracks 14 during reading or recording of data. The end 18 of the arm is attached to an actuator (not shown) which pivots the arm to move the transducer 20 from track to track.

The arm 10 also includes a heating element 22 such as a resistor, which is carried by one side of the arm 10. In the preferred embodiment, the heating element 22 is embedded in the arm 10. The arm 10 is made of a material which expands upon heating and contracts upon cooling such as metal, plastic or a composite material. When the heating element 22 heats, the side of the arm 10 having the heating element 22 expands as a function of the coefficient of linear expansion for the particular material and the transducer 20 moves in a direction across the track. When the heating element cools and the arm 10 cools, the arm contracts as a function of the coefficient of linear expansion and the transducer moves across the track in the opposite direction. The range of movement, typically in terms of microinches, and the type of movement depends on the geometry of the arm 10, material from which the arm is made and temperature rise or drop in the arm.

Figure 2:
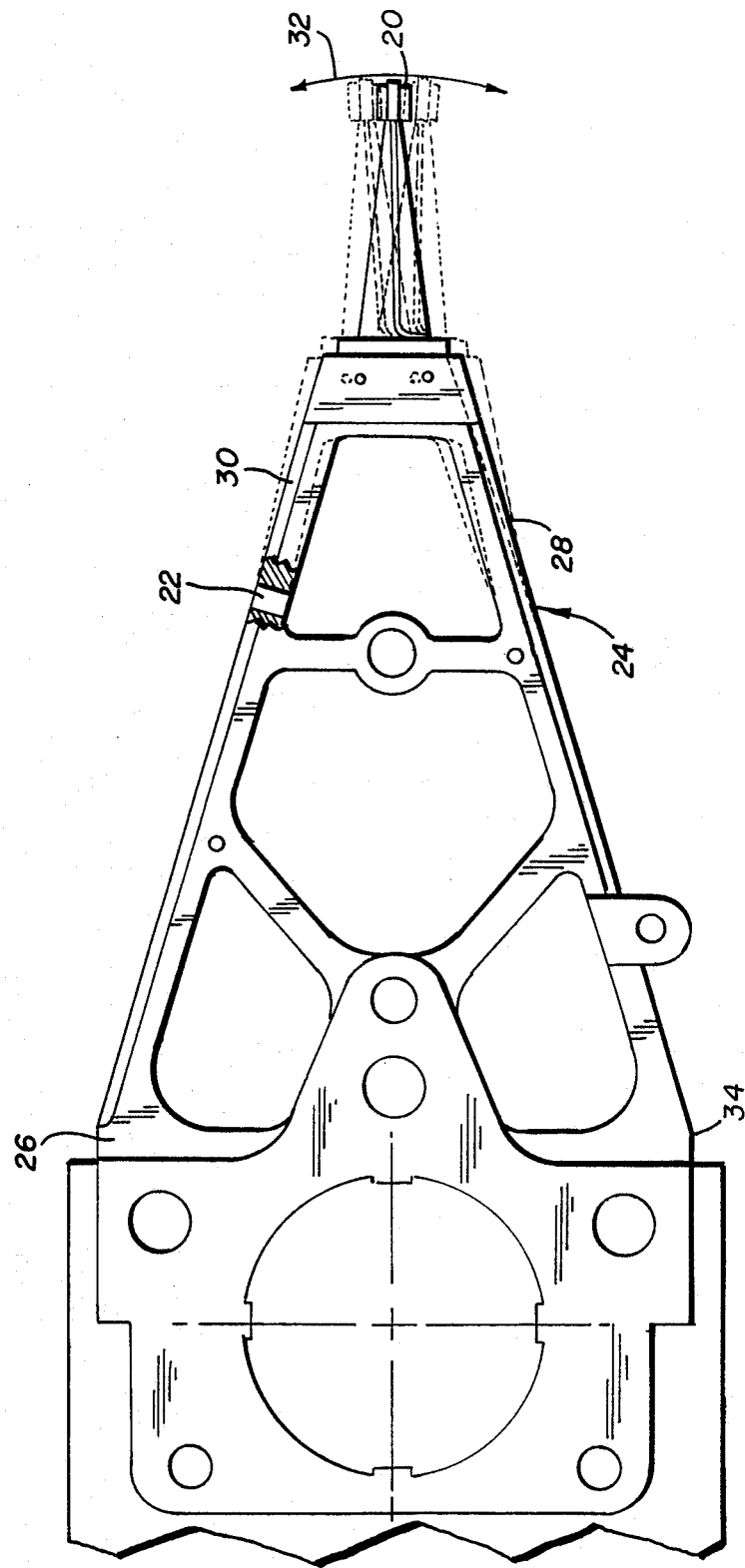
FIG. 2 is a top view of the thermally compensating fixed arm which shows several exaggerated positions of the arm.

FIG. 2, illustrates the motion of the arm 10 during its operation. In FIG. 2, the arm 10 is shown as a triangle 24 having a fixed base 26, a fixed length leg 28 and a variable length leg 30. The transducer 20 is positioned near the intersection of the fixed length leg 28 and the variable length leg 30. The fixed base 26 is assumed since the actuator (not shown) does not move after positioning the transducer 20. The heating element 22 is embedded in the variable length leg 30. The resulting motion is essentially along an arc 32 resulting from the fixed length leg 28 pivoting about the point 34 where the fixed length leg 28 attaches the fixed base 26. The centered position is shown in solid lines. Two additional positions of the arm 10 are shown in dashed lines. The amount of actual movement is very slight. The two additional positions shown in FIG. 2 are exaggerated in order to illustrate the motion. Furthermore, in order to keep FIG. 2 from becoming cluttered, dashed lines along only the free end of the triangle 24 show the two additional positions rather than showing dashed lines along the entire length of the fixed length leg 28 and the variable length leg 30.

Now turning to FIG. 3, the thermally compensating fixed arm 10 includes a circuit 38 having a heating element power supply 36, a read parameter amplifier 40 and a comparator 42. The circuit 38 detects an actual read parameter and compares it with the desired read parameter of the data. When the transducer 20 is off the center of the track, the actual read parameter will not match the desired read parameter. When the actual read parameter is compared to the desired read parameter at the comparator 42, the comparator 42 produces an error signal 44. The error signal 44 is input to the power supply 36. The power supply 36 either provides more or less power to the heating element 22 thereby moving the transducer 20 over the center of the track. With less power, the heating element 22 cools, the variable length leg 30 shortens and the transducer 20 moves one way. With more power, the heating element 22 heats, the variable length leg 30 elongates and the transducer 20 moves the other way.

Once the transducer 20 is again centered over the track 14, the desired read parameter and the actual read parameter are equal and no error signal 44 is produced. In the absence of an error signal 44, the circuit 38 supplies the heating element 22 with enough power to maintain the transducer position. In operation, heat is applied to the arm 10 at a predetermined rate and the transducer 20 is centered over the track 14. When the heating element 22 is a resistor, a constant amount of heat is typically applied to arm 10 by supplying the resistor with a constant amount of power equal to half of a pre-determined maximum power value. The actual read parameter is monitored during tracking and compared to the derived read parameter by the circuit 38. When the transducer 20 deviates from a position over the center of the track, the comparator 42 produces the error signal 44. The error signal 44 is input to the heating element power supply 36 which increases or decreases the amount of power to the heating element 22 to center the transducer.

The present invention and the best mode of practicing it have been described. It is to be understood that the foregoing description is illustrative only and that other means and techniques can be employed without departing from the full scope of the invention as described in the appended claims.

What is claimed is:

1. An apparatus for centering a transducer over a track of a magnetic disk, comprising:
    an arm having two ends, one of said ends immovably fastened to an actuator for rotating the arm;
    a slider attached at the other end of said arm, the transducer rigidly mounted to said slider; and
    means for selectively applying and removing thermal energy directly to and from said arm to cause thermal expansion and contraction in a portion of said arm to cause said arm to bend and move said slider and the transducer along on arcuate path in a plane substantially parallel to said disk and substantially transverse to said track to position the transducer over the center of said track.

2. The apparatus for centering a transducer as recited in claim 1 wherein the arm is made of metal.

3. The apparatus for centering a transducer as recited in claim 1 wherein the arm is made of plastic.

4. The apparatus for centering a transducer as recited in claim 1 wherein said means for selectively applying and removing thermal energy is a heating element carried by said arm.

5. The apparatus for centering a transducer as recited in claim 4 wherein said heating element is a resistor.

6. The apparatus for centering a transducer as recited in claim 1 wherein said means for selectively applying and removing thermal energy is a heating element embedded in said arm.

7. The apparatus for centering a transducer as recited in claim 6 wherein said heating element is a resistor.

8. The apparatus for centering a transducer as recited in claim 6 further comprising:
    means for indicating when the transducer is tracking off center; and
    means for varying the amount of heat applied to said arm wherein the amount of heat applied to said arm varies in response to a signal from said indicating means and centers the transducer over the track.

9. The apparatus for centering a transducer as recited in claim 8 wherein said indicating means is a comparator which compares an actual read parameter with a desired read parameter and produces an error signal when the actual read parameter is not equal to the desired read parameter.

10. The apparatus for centering a transducer as recited in claim 9 wherein said heat varying means is a heating element power supply which varies the amount of power supplied to the heating element in response to the error signal produced by the comparator.

11. An apparatus for positioning a transducer over the center of a track in a magnetic disk, comprising:
    an actuator;
    an arm which expands upon heating and contracts upon cooling, said arm having a first end immovably attached to said actuator and a free end, said actuator rotating said arm into a position over the track
    a slider attached to the free end of said arm;
    a transducer fixed within said slider;
    a heating element attached to said arm at a location where heat from said heating element results in movement of a selected portion of the arm to bend said arm and move said slider and said transducer along an arcuate path across the track in a plane substantially parallel to the plane of the magnetic disk;
    a source of power; and
    a circuit for selectively varying the amount of power to the heating element to maintain the transducer substantially over the center of the track.

12. The apparatus for positioning a transducer as recited in claim 11 wherein said circuit further comprises a comparator which compares an actual read parameter with a desired read parameter and produces an error signal when the actual and desired read parameters are not equal, said error signal being input to said power supply to produce an amount of power to center the transducer over the tack.

13. The apparatus for positioning the transducer of claim 12 wherein the arm is made of metal.

14. The apparatus for positioning the transducer of claim 12 wherein the arm is made of plastic.

15. The apparatus for positioning the transducer of claim 12 wherein the heating element is a resistor.

* * * * *